United States Patent [19]

Akiyoshi et al.

[11] Patent Number: 4,842,343
[45] Date of Patent: Jun. 27, 1989

[54] VEHICLE BRAKING SYSTEM FOR DRIVE WHEELS, HAVING MEANS FOR DETERMINING A TIME FOR REDUCING BRAKING PRESSURE

[75] Inventors: Michio Akiyoshi; Chiaki Hamada, both of Susono, Japan

[73] Assignee: Toyota Jidosha Kabushiki Kaisha, Aichi, Japan

[21] Appl. No.: 185,539

[22] Filed: Apr. 25, 1988

[30] Foreign Application Priority Data

Apr. 23, 1987 [JP] Japan ................................. 62-100820

[51] Int. Cl.$^4$ ................................................ B60T 8/60
[52] U.S. Cl. ..................................... 303/103; 303/95; 303/108; 303/68
[58] Field of Search ................................... 303/91–119, 303/DIG. 1–4, 68, 20; 364/426; 188/181

[56] References Cited

U.S. PATENT DOCUMENTS

| Re. 31,383 | 9/1983 | Leiber et al. | 303/95 X |
|---|---|---|---|
| 3,832,008 | 8/1974 | Leiber et al. | 303/96 X |
| 3,988,042 | 10/1976 | Aoki et al. | 303/108 |
| 4,033,634 | 7/1977 | Arai et al. | 303/103 |
| 4,180,223 | 12/1979 | Amberg | 303/106 X |
| 4,320,460 | 3/1982 | Brearley et al. | 303/103 X |
| 4,384,330 | 5/1983 | Matsuda et al. | 303/109 X |
| 4,392,202 | 7/1983 | Matsuda | 303/109 X |
| 4,430,714 | 2/1984 | Matsuda et al. | 303/95 X |
| 4,671,579 | 6/1987 | Sawano et al. | 303/95 |
| 4,763,960 | 8/1988 | Uchida et al. | 303/97 |

FOREIGN PATENT DOCUMENTS

5826661 8/1981 Japan .

Primary Examiner—Douglas C. Butler
Attorney, Agent, or Firm—Oliff & Berridge

[57] ABSTRACT

Control system for controlling an anti-lock braking system having a brake for a wheel of a motor vehicle, wherein a skidding or locking condition of the wheel is detected by a detector based on a running condition of the vehicle and a rotating condition of the wheel, and a slip ratio of the vehicle is maintained within an optimum range by a pressure-regulating device, by increasing, decreasing and holding a brake fluid pressure applied to the brake, in response to the detected locking condition of the wheel. A predetermined pressure-decrease time during which the fluid pressure is decreased is measured by a measuring device, and a deceleration rate of a rotating speed of the wheel when the pressure-decrease time has elapsed is detected by a detecting device. A device is provided for determining an extension time during which the fluid pressure is further decreased, such that the extension time increases with the detected deceleration rate of the wheel. The pressure-regulating device is activated to further decrease the fluid pressure for the determined extension time.

10 Claims, 6 Drawing Sheets

VEHICLE BRAKING SYSTEM FOR DRIVE WHEELS, HAVING MEANS FOR DETERMINING A TIME FOR REDUCING BRAKING PRESSURE

BACKGROUND OF THE INVENTION

1. Field of the Invention

The present invention relates to a method and an apparatus for controlling a hydraulically operated anti-lock braking system for a motor vehicle, so as to avoid an excessive slip ratio of a wheel of the vehicle during brake application, and more particularly improvements in connection with an operation to lower the brake fluid pressure applied to a brake for the wheel.

2. Discussion of the Prior Art

A hydraulically operated brake is widely used for an automotive vehicle. The brake is actuated by a fluid pressure generated by a suitable hydraulic pressure source such as a master cylinder or a hydraulic pump, so that the brake applies a braking force to the corresponding wheel of the vehicle.

If the fluid pressure applied to the hydraulic brake is excessively high with respect to the coefficient of friction of a road surface, the rotating wheel tends to be locked and skids on the road surface. Even where the wheel is not perfectly locked, the friction force between the wheel surface and the road surface is reduced if the slip ratio of the wheel exceeds an optimum level. In this instance, the required braking distance of the vehicle is increased, or the running stability of the vehicle is deteriorated.

In light of the above undesirable phenomenon during brake application to the wheel, the hydraulic brake is controlled in a so-called "anti-lock" or "anti-skid" manner. An example of an anti-lock control arrangement is disclosed in Laid-open publication No. 58-26661 (published in 1983) of unexamined Japanese Patent Application. In the disclosed arrangement, a locking or skidding condition of the wheel as represented by a slip amount or slip ratio of the wheel is detected by comparing a running condition of the vehicle such as a running speed or deceleration rate of the vehicle, with a rotating condition of the wheel such as a rotating speed or deceleration rate of the vehicle. The slip ratio of the wheel is maintained within an optimum range, by increasing, decreasing or holding the brake fluid pressure, based on the detected locking condition of the wheel.

Such an anti-lock braking system is adapted to commence decreasing the brake fluid pressure if and when the slip amount or ratio of the wheel exceeds a predetermined value. When a predetermined pressure-decrease time has passed, the fluid pressure is held at the reduced level or increased. According to another control arrangement, the decrease in the fluid pressure is commenced if and when the deceleration rate of the wheel falls below a predetermined level. In this case, the fluid pressure is held at the reduced level or increased when the wheel deceleration rate is restored to the predetermined level. These are some examples of the manner in which the brake fluid pressure is regulated in a known anti-lock manner.

However, since the slipping or skidding condition of a vehicle wheel significantly varies depending upon various conditions or parameters when a brake is applied to the wheel, there still exists a problem to be solved. That is, the brake fluid pressure cannot be adequately decreased by an optimum amount if the fluid pressure is decreased for a predetermined fixed time span or as long as the deceleration rate of the wheel is below a predetermined level. Consequently, the known anti-lock control systems are not completely satisfactory, suffering from a relatively long braking distance of the vehicle and/or an insufficient degree of straight-line running stability of the vehicle.

SUMMARY OF THE INVENTION

It is therefore a first object of the present invention to provide a method of controlling an anti-lock braking system for a motor vehicle, in which an operation to lower or decrease the brake fluid pressure applied to a brake for a vehicle wheel is controlled in an improved manner, by which it is possible to precisely control the slip ratio of the wheel so as to be maintained within an optimum range, irrespective of varying conditions during brake application to the wheel.

A second object of the present invention is to provide a control system or apparatus which is adapted to suitably practice the control method of the invention.

The first object may be achieved according to one aspect of the present invention, which provides a method of controlling an anti-lock braking system having a brake for a wheel of a motor vehicle, wherein a slip ratio of a wheel of the vehicle is maintained within an optimum range, by detecting a skidding or locking condition of the wheel based on a running condition of the vehicle and a rotating condition of the wheel, and by increasing, decreasing and holding a brake fluid pressure applied to the brake, in response to the detected locking condition of the wheel, comprising the steps of: (a) detecting a lapse of a predetermined pressure-decrease time after the commencement of a decrease in the fluid pressure; (b) detecting a deceleration rate of a rotating speed of the wheel when the pressure-decrease time has elapsed; (c) determining an extension time during which the fluid pressure is further decreased, the extension time being determined so as to increase with the detected deceleration rat of the wheel; and (d) decreasing the fluid pressure for the determined extension time.

In the anti-lock control method of the present invention described above, the deceleration rate of the wheel is detected after the fluid pressure is lowered for the predetermined pressure-decrease time. The extension time for further lowering the fluid pressure is determined depending upon the detected wheel deceleration rate. Since the second pressure-decrease time, i.e., the extension time is determined based on the detected deceleration rate, the total pressure-decrease time is adjusted to meet the varying condition in which the wheel is braked. Hence the instant control method assures an adequate anti-lock control of the brake fluid pressure, so as to maintain the slip amount or ratio of the wheel within the optimum range, with enhanced accuracy.

The skidding or locking condition of the wheel may be detected as a difference between a running speed of the vehicle and a rotating speed of the wheel. The decrease in the fluid pressure for the predetermined pressure-decrease time may be commenced after the difference exceeds a predetermined value. In this instance, the decrease for the predetermined pressure-decrease time, especially the initial decrease, may be commenced if the difference exceeds a predetermined value and if the deceleration rate of the wheel detected before the commencement exceeds a predetermined threshold value.

In one form of the invention, the method further comprises the steps of: determining whether the deceleration rate of the wheel is increasing or decreasing when the determined extension time has elapsed; and continuing an operation to decrease the fluid pressure even after the extension time has elapsed, if the deceleration rate is increasing when the extension time has elapsed, or holding the fluid pressure after the extension time has elapsed, if the deceleration rate is decreasing when the extension time has elapsed. According to this arrangement, the fluid pressure is continuously decreased after the extended period of pressure decrease, or alternatively the reduced pressure is maintained. These two alternatives are selected depending upon the preceding determination of whether the deceleration rate of the wheel is increasing or decreasing at the end of the extended period of pressure decrease. In this case, therefore, the rotating condition or deceleration rate of the wheel is detected twice after the fluid pressure is initially decreased so as to effect an anti-lock control operation of the brake fluid pressure. The fluid pressure is decreased based on the two determinations on the actual condition of the wheel, so that the anti-lock control operation may be achieved with increased precision.

In the above form of the invention, the determination of whether the deceleration rate of the wheel is increasing or decreasing may be effected after the fluid pressure is maintained for a predetermined pressure-hold time after the extension time has elapsed. The operation to decrease the fluid pressure after the extension time has elapsed may continue until the deceleration rate starts to decrease. Preferably, after the completion of the operation to decrease the fluid pressure following the decrease for the extension time, the fluid pressure is held for a predetermined control time as measured from the commencement of the initial decrease in the fluid pressure. Similarly, it is preferred that the step of holding the fluid pressure after the extension time has elapsed is continued until the predetermined control time has elapsed.

In another form of the present invention, the step of determining the extension time is achieved by first determining a relationship between a plurality of successive ranges of the deceleration rate of the wheel, and a corresponding plurality of different values of the extension time, and then selecting one of the different values of the extension time which corresponds to the deceleration rate detected when the predetermined pressure-decrease time has elapsed.

The second object of the present invention can be accomplished according to another aspect of the present invention, which provides a control system for controlling an anti-lock braking system having a brake for a wheel of a motor vehicle, including detector means for detecting a skidding or locking condition of the wheel based on a running condition of the vehicle and a rotating condition of the wheel, and pressure-regulating means for maintaining a slip ratio of the vehicle within an optimum range by increasing, decreasing and holding a brake fluid pressure applied to a brake for the wheel, in response to the detected locking condition of the wheel, the control system comprising: (a) time-measuring means for measuring a predetermined pressure-decrease time during which the fluid pressure is decreased; (b) detecting means for detecting a deceleration rate of a rotating speed of the wheel when the pressure-decrease time has elapsed; and (c) decrease-time extending means for determining an extension time during which the fluid pressure is further decreased, such that the extension time increases with the detected deceleration rate of the wheel, the decrease-time extending means activating the pressure-regulating means to further decrease the fluid pressure for the determined extension time.

The instant control system may further comprise means for determining whether the deceleration rate of the wheel is increasing or decreasing when the determined extension time has elapsed, and for controlling the pressure-regulating means so as to continue an operation to decrease the fluid pressure even after the extension time has elapsed, if the deceleration rate is increasing when the extension time has elapsed, or alternatively, so as to hold the fluid pressure after the extension time has elapsed, if the deceleration rate is decreasing when the extension time has elapsed.

BRIEF DESCRIPTION OF THE DRAWINGS

The above and optional objects, features and advantages of the present invention will be better understood by reading the following detailed description of presently preferred embodiments of the invention, when considered in conjunction with the accompanying drawings, in which.

DETAILED DESCRIPTION OF THE PREFERRED EMBODIMENTS

Referring to the accompanying drawings, there will be described the presently preferred embodiments of the invention, as applied to an anti-lock braking system for a 4-wheel motor vehicle wherein two mutually independent hydraulic systems are provided for front and rear pairs of wheels.

Figure 1:
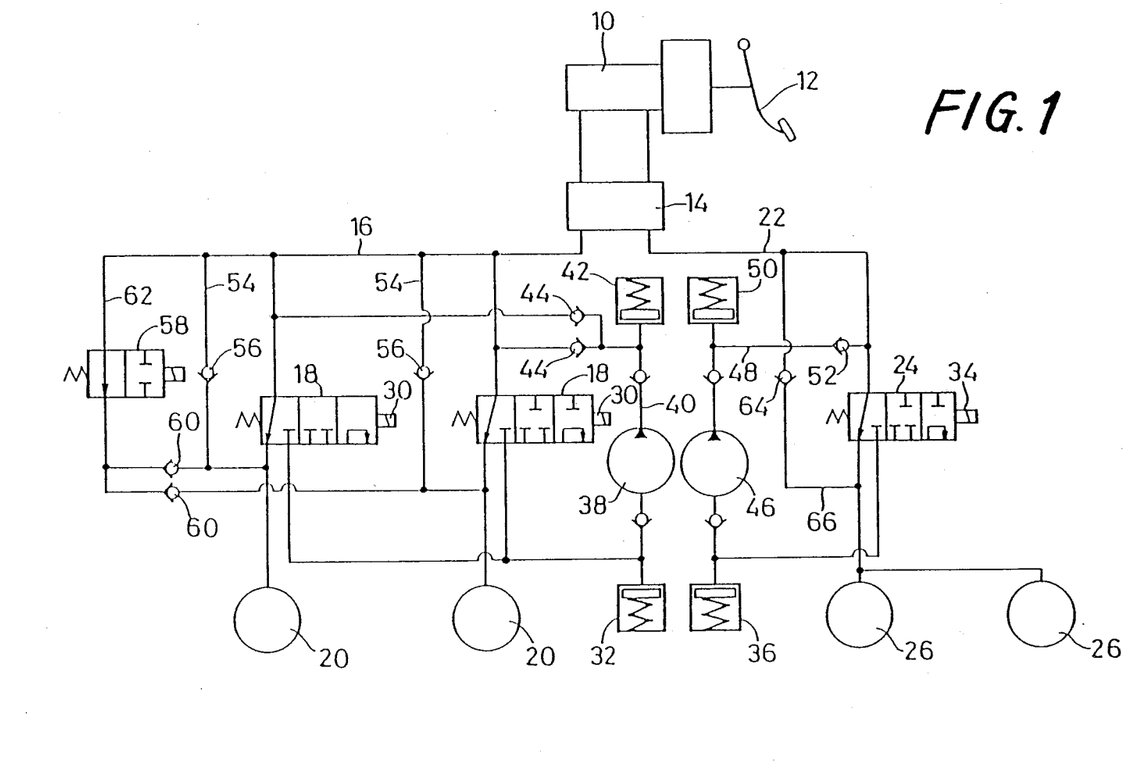
FIG. 1 is a circuit diagram of a hydraulically operated anti-lock braking system for a motor vehicle, to which an anti-lock control method according to one embodiment of the present invention is suitably applicable.

In FIG. 1, reference numeral 10 designates a master cylinder which has two mutually independent pressurizing chambers. The master cylinder 10 is adapted to produce fluid pressures which are proportional to an operating force acting on a brake pedal 12 of the vehicle. The fluid pressure developed in one of the two chambers of the master cylinder 10 is fed to a primary fluid passage 16 via a proportioning/by-pass valve 14. The fluid passage 16 is split into two branch lines which are connected to respective front wheel cylinders 20, 20 via respective solenoid-operated, three-position directional control valves 18, 18. The fluid pressure developed in the other chamber of the master cylinder 10 is fed to another primary fluid passage 22 via the proportioning/by-pass valve 14. In this fluid passage 22, there is provided another solenoid-operated, three-position directional control valve 24. The fluid passage 22 is split, at a portion downstream of the valve 24, into two branch lines connected to respective rear wheel cylinders 26, 26. Thus, the instant braking system has two independent hydraulic circuits, one for the front wheel cylinders 20 for applying brake to front wheels of the vehicle, and the other for the rear wheel cylinders 26 for applying brake to rear wheels of the vehicle.

While the front hydraulic circuit including the primary fluid passage 16 is normal or intact, the proportioning/by-pass valve 14 functions to proportionally reduce the received master cylinder pressure and deliver the reduced pressure to the rear hydraulic circuit including the primary fluid passage 22. While the front hydraulic circuit is not normally functioning or defective, the proportioning/by-pass valve 14 operates to transmit the master cylinder pressure to the rear wheel cylinders 26, 26, without the proportional pressure reduction.

The three-position directional control valves 18 are normally placed in a pressure-increase position in which the front wheel cylinders 20 communicate with the master cylinder 10 through the valves 18. When a solenoid 30 of each valve 18 is energized by a comparatively large amount of electric current, the valve 18 is switched to a pressure-decrease position in which the corresponding front wheel cylinder 20 is disconnected from the master cylinder 10, but communicates with a reservoir 32 through the valve 18. When the solenoid 30 is energized by a comparatively small amount of current, the valve 18 is placed in a pressure-hold position in which the front wheel cylinder 20 is disconnected from both the master cylinder 10 and the reservoir 32. Similarly, the three-position directional control valve 24 is operated, according to an operating state of its solenoid 34, so that the valve 24 is selectively placed in its pressure-increase position for communication between the rear wheel cylinders 26 and the master cylinder 10, pressure-decrease position for communication between the rear wheel cylinders 26 and a reservoir 36, or pressure-hold position for disconnection of the cylinders 26 from the master cylinder 10 and the reservoir 36.

The brake fluid in the reservoir 32 is pumped by a pump 38, and is returned to the primary fluid passage 16 through a pump passage 40. The pump passage 40 incorporates a damper 42 for attenuating a discharge pressure pulsation of the pressurized fluid delivered by the pump 38. The pump passage 40 further incorporates two check valves 44 for preventing flows of the fluid in a direction from the primary fluid passage 16 into the damper 42.

The rear hydraulic circuit has a pump 46, a pump passage 48, a damper 50, and a check valve 52, which are identical with those used in the front system.

The front hydraulic circuit is also provided with two recirculating passages 54 which permit return flows of the pressurized fluid from the front wheel cylinders 20 back into the master cylinder 10, while by-passing the respective directional control valves 18. Each recirculating passage 54 incorporates a check valve 56 for preventing a flow of the fluid toward the front wheel cylinders 20. The front hydraulic circuit is further provided with a by-pass passage 62 in which are incorporated a normally open shut-off valve 58, and two check valves 60. When the pressure developed by the master cylinder 10 is applied to the front wheel cylinders 20, the pressurized fluid is supplied to the cylinders 20 through the by-pass passage 62, as well as through the primary fluid passage 16, so that the cylinders 20 are activated at a sufficiently high rate of flow of the pressurized fluid.

The rear hydraulic circuit is provided with a recirculating passage 66 equipped with a check valve 64, but is not provided with a by-pass passage.

Figure 2:
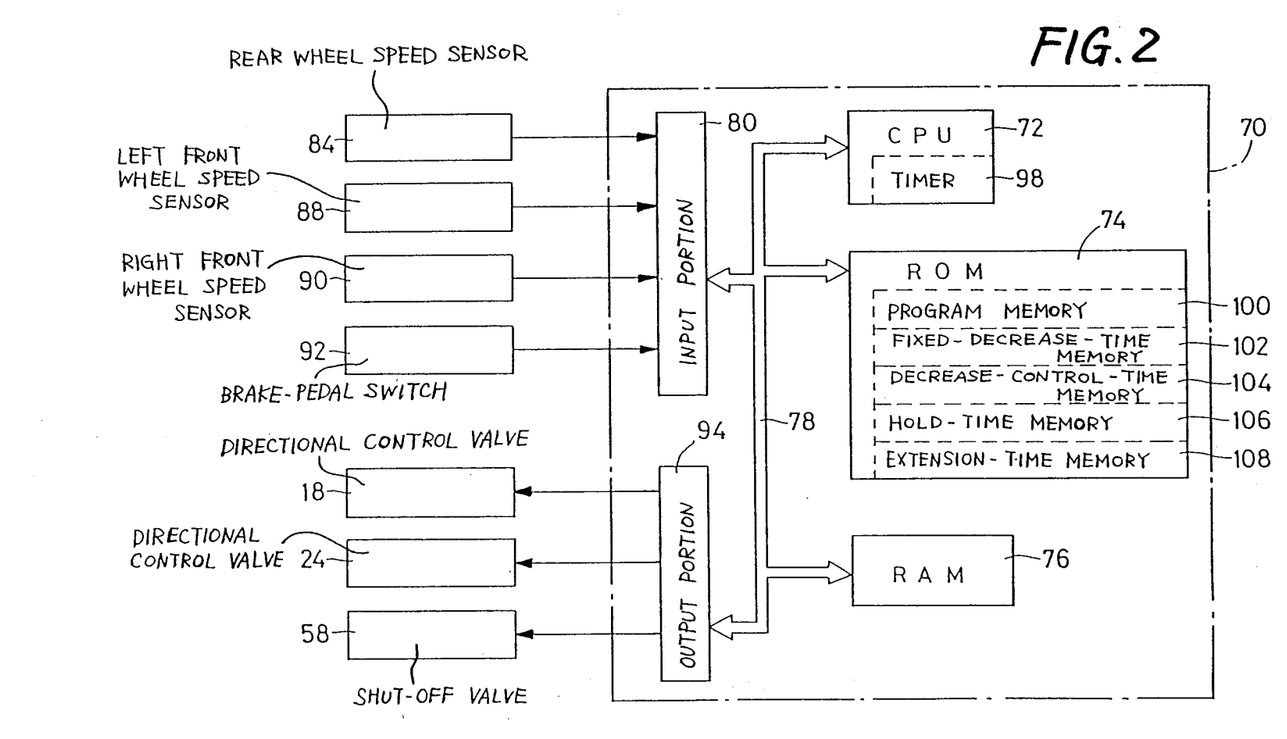
FIG. 2 is a block diagram showing one embodiment of an electric control system of the invention for the braking system of FIG. 1, which is adapted to practice the anti-lock control method of the invention.

Referring to FIG. 2, there is shown an electric control system for controlling the solenoid-operated, three-position directional control valves 18, 24, and the shut-off valve 58. The control system is principally constituted by an anti-lock control unit 70 which is principally constituted by a computer. This anti-lock control unit 70 includes a CPU (central processing unit) 72, a ROM (read-only memory) 74, a RAM (random access memory) 76, an input portion 80, an output portion 94, and a bus 78 for interactive communication within the computer. To the input portion 80, there are connected speed sensors 84, 88 and 90, and a brake-pedal switch 92 for detecting a depression of the brake pedal 12. The speed sensor 84 detects an average rotating speed of the left and right rear wheels of the vehicle, based on a rotating speed of a propeller shaft of the vehicle, and the speed sensors 88, 90 detect rotating speeds of the left and right front wheels. To the output portion 94 of the control unit 70 are connected the above-described three-position control valves 18, 24 and the shut-off valve 58.

The CPU 72 incorporates a timer 98 whose function will be described. The ROM 74 includes a program memory 100 which stores various pressure regulating control programs such as a pressure-decrease routine represented by the flow chart of FIG. 3. The ROM 74 further includes a FIXED-DECREASE-TIME memory 102 for storing a predetermined pressure-decrease time T1, a DECREASE-CONTROL-TIME memory 104 for storing a pressure-decrease control time T3, and a HOLD-TIME memory 106 for storing a pressure-hold time Th. The ROM 74 also includes an EXTENSION-TIME memory 108 for storing a relationship between a deceleration rate $\alpha$ of the vehicle wheel speed and an extension time T2 during which the pressure-decrease time is extended. Namely the EXTENSION-TIME memory 108 stores a data map for obtaining the extension time T2 depending upon the deceleration rate $\alpha$ of the wheel speed.

Figure 5:
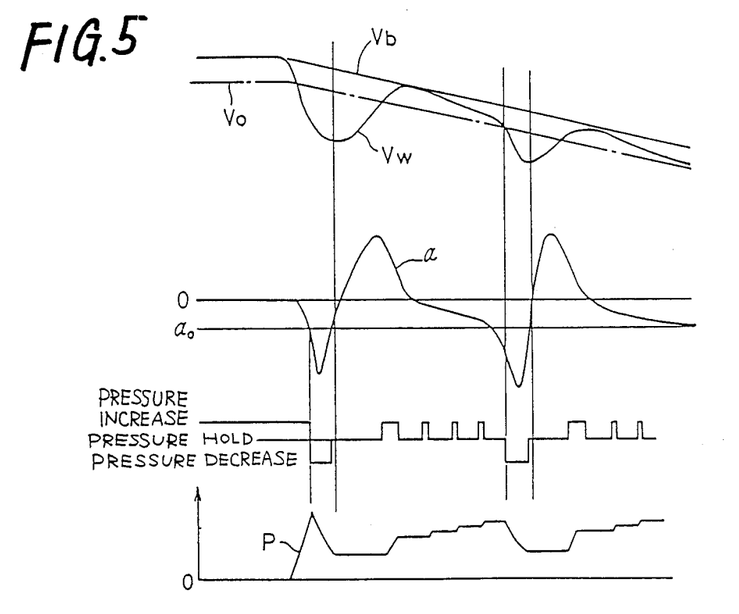
FIG. 5 is a diagrammatic view for explaining one example of a pressure regulating operation performed by the control system of FIG. 2 according to the present invention.

Referring to FIG. 5, there will be described an example of an operation to regulate a brake fluid pressure P applied to the wheel cylinders 20, 26 in the anti-lock braking system of FIG. 1, by the control system shown in FIG. 2.

When the brake pedal 12 is operated, the brake fluid pressure P is raised as indicated in the lowermost stage of FIG. 5, and a running speed Vb of the vehicle starts to be lowered as indicated in the uppermost stage of FIG. 5. The vehicle speed Vb is calculated by the CPU 72, based on a highest one of the speeds detected by the rear wheel speed sensor 84, left front wheel speed sensor 88 and right front wheel speed sensor 90.

When the braking force applied to any one of the four wheels becomes excessively large, the rotating speed Vw of that wheel (hereinafter referred to simply as "wheel speed") is lowered as compared with the vehicle speed Vb. The solenoid-operated directional control valve 18, 24 corresponding to the relevant wheel is switched from the pressure-increase position to the pressure-decrease position to decrease the fluid pressure in the corresponding wheel cylinder 20, 26, as indicated in the third stage of FIG. 5 (from the top of the figure), if the wheel speed Vw becomes lower than a predetermined target wheel speed Vo lower than the vehicle speed Vb, and if the deceleration rate α of the relevant wheel becomes lower than a predetermined threshold value αo as indicated in the second stage of FIG. 5 (from the top of the figure). The target wheel speed Vo is lower than the wheel speed Vb by an amount which corresponds to an optimum slip ratio of the wheels. If the above two conditions are met, the fluid pressure P applied to the relevant wheel cylinder 20, 26 which has been raised commences to be reduced. As a result of the braking pressure reduction, the slip ratio of the relevant wheel is reduced, and the deceleration rate α of that wheel starts to increase a certain time after the commencement of the braking pressure reduction.

Figure 3:
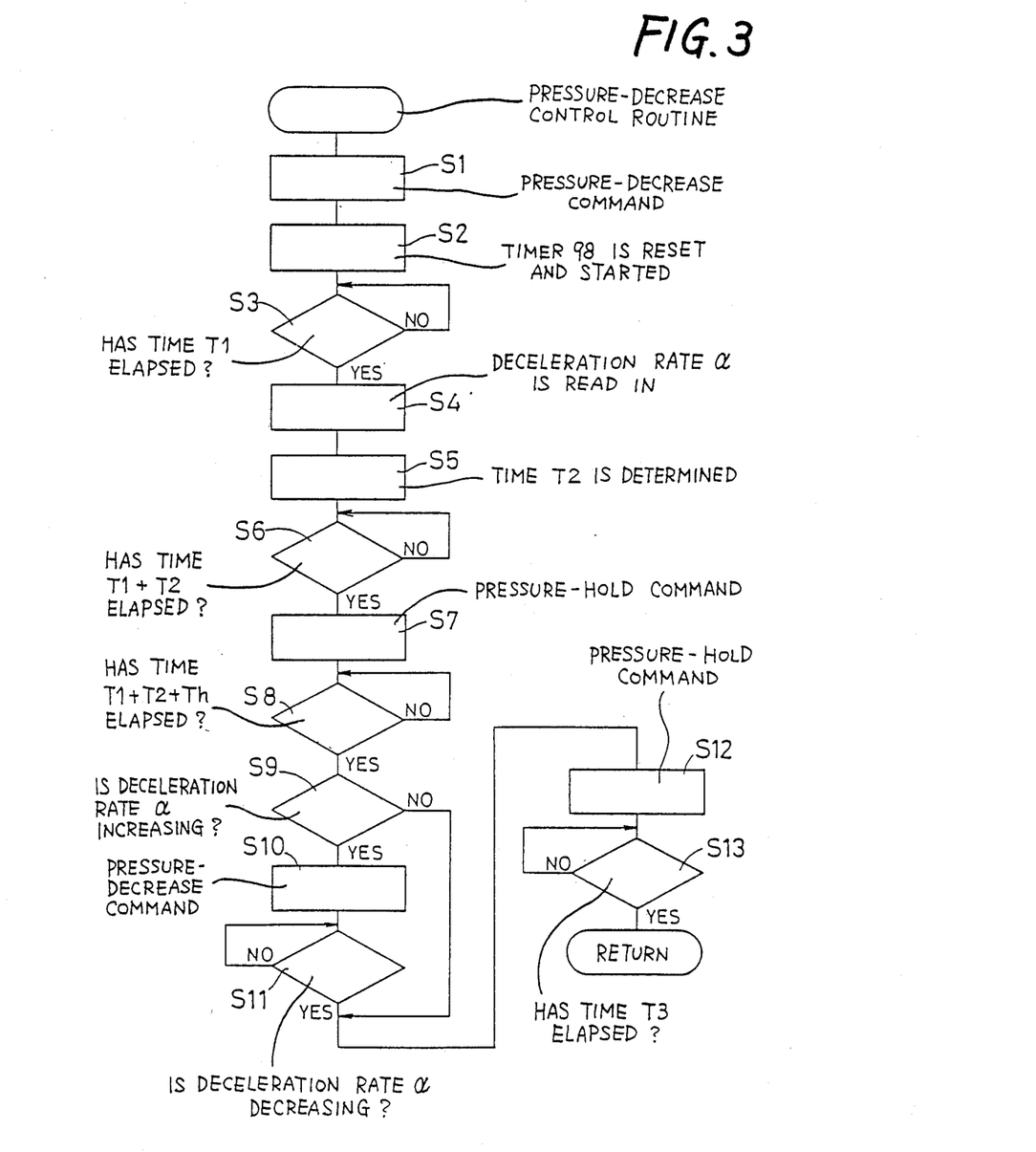
FIG. 3 is a flow chart representing a pressure-decrease control routine stored in a program memory of a ROM of the control system of FIG. 2.

Then, the fluid pressure P is rapidly or slowly increased, or held at the same level, or rapidly or slowly decreased, so that the pressure P is maintained at an almost optimum level, whereby the wheel speed Vw is controlled so as to be maintained at a value almost equal to or near the target wheel speed Vo. Since the operation to hold or increase the fluid pressure P for an anti-lock braking control are effected in an ordinary manner and are not essential to the understanding of the present invention, no further details of the pressure holding or increasing operation will be described. Hereunder, the pressure decreasing operation will be described in detail, by reference to the flow chart of FIG. 3. In the illustrated embodiment, when the wheel speed Vw is lowered below the predetermined target level Vo for the first time, the pressure-decrease control routine of FIG. 3 is started o only when or after the wheel deceleration rate α is below or lowered below the predetermined threshold value αo. For second and subsequent occurrences of the reduction of the wheel speed Vw below the target speed Vo, the pressure-decrease control routine is started irrespective of the wheel deceleration rate.

Figure 6:
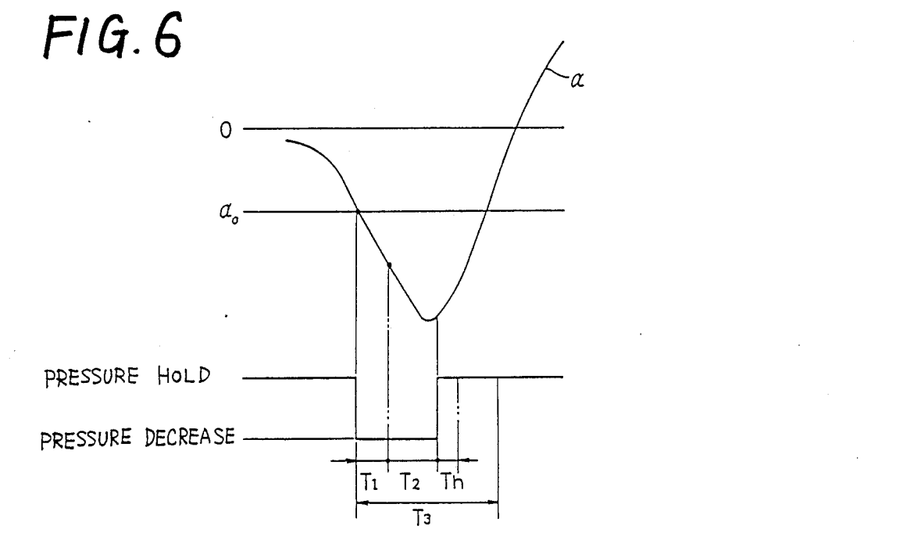
FIGS. 6 and 7 are explanatory views illustrating a pressure-decrease control example according to the anti-lock control method of the invention, and a variation in the deceleration rate of the wheel speed.

Referring to FIG. 3, upon generation of a PRESSURE-DECREASE command from the anti-lock control unit 70 in step S1, the control flow goes to step S2 in which the timer 98 of the CPU 72 is reset and started. Then, the control flow goes to step S3 to check if the predetermined pressure-decrease time T1 stored in the FIXED-DECREASE-TIME memory 102 has elapsed or not. That is, step S3 is repeatedly executed until the content of the timer 98 exceeds the predetermined time T1. Accordingly, the fluid pressure P is lowered for the predetermined or fixed pressure-decrease time T1, as indicated in FIG. 6.

Figure 4:
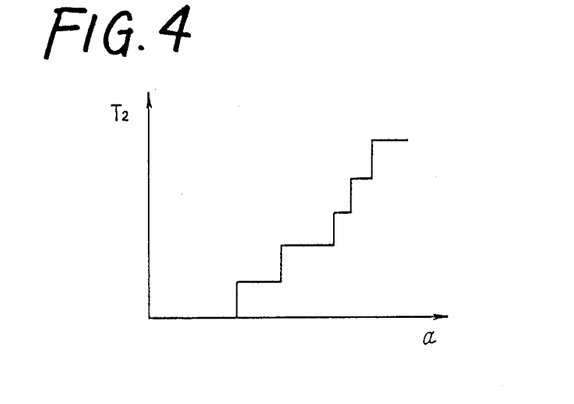
FIG. 4 is a graph representing a relationship stored in a "extension-time" memory of the ROM, between a deceleration rate of the vehicle wheel speed and a pressure-decrease extension time.

After the fixed pressure-decrease time T1 has elapsed, the control flow goes to step S4 in which the CPU 74 reads in the deceleration rate α of the relevant wheel. Step S4 is followed by step S5 in which the CPU 72 determines the extension time T2, based on the deceleration rate α obtained in step S4, and according to the relationship of FIG. 4 stored in the EXTENSION-TIME memory 108. The relationship is determined so that the extension time T2 increases with the wheel deceleration rate (absolute value of the wheel acceleration rate having a negative sign). Then, the control flow goes to step S6 to determine whether a sum of the fixed pressure-decrease time T1 and the extension time T2 has elapsed or not. Namely, step S6 is repeated until the content of the timer 98 exceeds the sum (T1+T2). Accordingly, the fluid pressure P is lowered for the time span (T1+T2), as indicated in FIG. 6.

After the time span (T1+T2) has elapsed, steps S7 and S8 are executed to hold or maintain the current fluid pressure P for the predetermined pressure-hold time stored in the HOLD-TIME memory 106. Then, the control flow goes to step S9 to determine whether the wheel deceleration rate α is increasing or not. This determination is accomplished by obtaining two values of the deceleration rate α at two points of time defining a very short span, and determining whether a difference of an absolute value of the first obtained deceleration rate from an absolute value of the last obtained deceleration rate is a positive value or not. If the deceleration rate α is constant or decreasing, the control flow goes to step S12, while skipping steps S10 and S11. In step S12, a PRESSURE-HOLD command is generated. It follows from FIG. 6 that the fluid pressure P is reduced (with the appropriate control valve 18, 24 placed in the pressure-decrease position) for the time span of the predetermined time T1 plus the extension time T2, and is thereafter held at the reduced level. The significance of the pressure-hold time Th following the time span (T1+T2) lies in the determination as to whether the wheel deceleration rate α increases or decreases after the fluid pressure P has been held constant for the pressure hold time Th following the expiration of the total pressure-decrease time (T1+T2).

Figure 7:
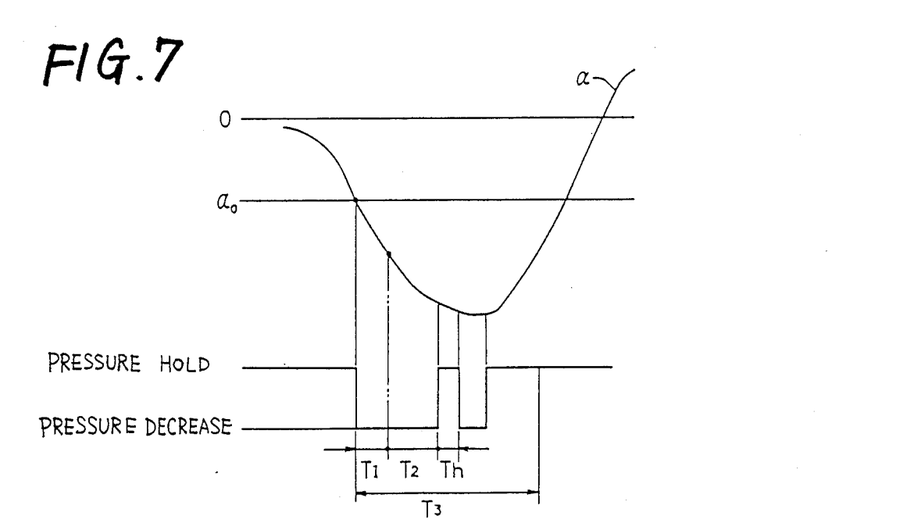

If the wheel deceleration rate is still increasing even after the expiration of the pressure-hold time Th, an affirmative decision (YES) is obtained in step S9, and a PRESSURE-DECREASE command is generated in step S10. Then, the control flow goes to step S11 to determine whether the deceleration rate α has started to decrease. Step S11 is repeated until an affirmative decision (YES) is obtained in step S11. In other words, the appropriate control valve 18, 24 is held in the pressure-decrease position to further lower the fluid pressure P, until the deceleration rate α has started to decrease, as indicted in FIG. 7. When an affirmative decision is obtained in step S11, the control flow goes to step S12 to hold the reduced fluid pressure P. Thus, after the expiration of the pressure-hold time Th, the fluid pressure P is reduced for a suitable time span until the deceleration rate α begins to decrease.

The PRESSURE-HOLD command generated in step S12 is kept active until an affirmative decision (YES) is obtained in step S13, or until the predetermined pressure-decrease control time T3 stored in the DECREASE-CONTROL-TIME memory 104 has elapsed. Upon expiration of this control time T3, one pressure-decrease control routine is terminated, and the fluid pressure P is held or increased in an ordinary anti-lock control fashion.

Figure 8:
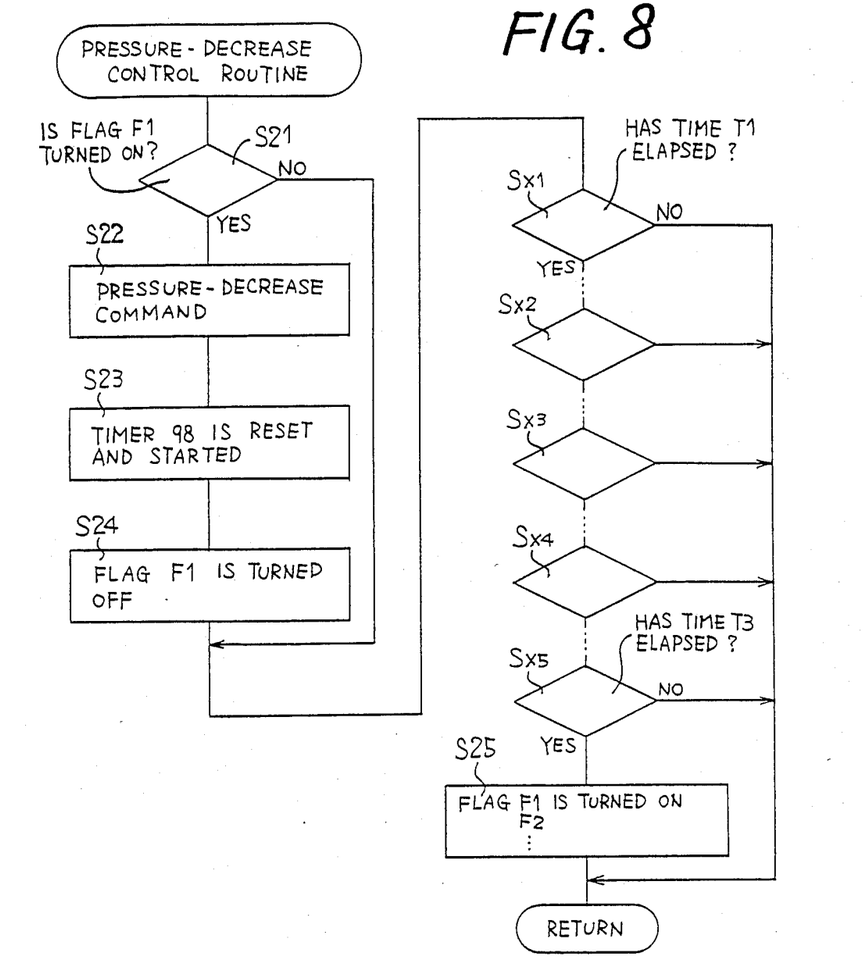
FIG. 8 is a flow chart showing a part of a pressure-decrease control routine used according to another embodiment of the invention.

In the illustrated embodiment shown in the flow chart of FIG. 3, the pressure-decrease control routine (consisting of steps S1–S13) is executed only once for a PRESSURE-DECREASE command. However, the pressure-decrease control routine of FIG. 3 may be replaced by a modified pressure-decrease control routine as shown in FIG. 8. In this case, the control flow goes back to the main control routine each time a negative decision (NO) is obtained in any one of steps Sx1, Sx2, Sx3, Sx4 and Sx5 which correspond to the decision steps S3, S6, S8, S11 and S13 of the routine of FIG. 3. That is, when a negative decision is obtained in any one of the steps Sx1–Sx5, the control flow returns to step S21 (beginning of the pressure-decrease control routine) through the main routine to repeat the pressure-decrease control routine. Steps S22 and S23 correspond to steps S1 and S2 of the routine of FIG. 3. Step S21 is provided to skip steps S22 and S23, after a negative decision is obtained in any one of the steps Sx1–Sx5 after the PRESSURE-DECREASE command has been generated in step S22, i.e., after step S24 has been executed.

While the present invention has been described in conjunction with specific embodiments, it is evident that many alternatives, modifications and variations will be apparent to those skilled in the art in light of the foregoing description. Accordingly, it is intended to embrace all such alternatives, modifications and variations that fall within the spirit and scope of the following claims.

What is claimed is:

1. A method of controlling an anti-lock braking system having a brake for a wheel of a motor vehicle, wherein a slip ratio of a wheel of the vehicle is maintained within an optimum range, by detecting a skidding or locking condition of the wheel based on a running condition of the vehicle and a rotating condition of the wheel, and by increasing, decreasing and holding a brake fluid pressure applied to said brake, in response to the detected locking condition of the wheel, comprising the steps of:

detecting a lapse of a predetermined pressure-decrease time after the commencement of a decrease in said fluid pressure;
    detecting a deceleration rate of a rotating speed of said wheel when said pressure-decrease time has elapsed;
    determining an extension time during which the fluid pressure is further decreased, said extension time being determined so as to increase with the detected deceleration rate of said wheel; and
    decreasing said fluid pressure for the determined extension time.

2. A method of controlling an anti-lock braking system according to claim 1, further comprising the steps of:

determining whether the deceleration rate of said wheel is increasing or decreasing when said determined extension time has elapsed; and
    continuing an operation to decrease said fluid pressure even after said extension time has elapsed, if the deceleration rate is increasing when said extension time has elapsed, and holding said fluid pressure after said extension time has elapsed, if the deceleration rate is decreasing when said extension time has elapsed.

3. A method of controlling an anti-lock braking system according to claim 2, wherein said step of determining whether the deceleration rate of said wheel is increasing or decreasing comprises holding said fluid pressure for a predetermined pressure-hold time after said extension time has elapsed, and determining whether the deceleration rate of the wheel is increasing or decreasing when said pressure-hold time has elapsed.

4. A method of controlling an anti-lock braking system according to claim 2, wherein said step of continuing an operation to decrease said fluid pressure continues until the deceleration rate starts to decrease.

5. A method of controlling an anti-lock braking system according to claim 4, wherein after said step of continuing an operation to decrease said fluid pressure is completed, said fluid pressure is held until a predetermined control time has elapsed from said commencement of a decrease in the fluid pressure, and wherein said step of holding said fluid pressure after said extension time has elapsed is continued until said predetermined control time has elapsed.

6. A method of controlling an anti-lock braking system according to claim 1, wherein said step of determining an extension time comprises determining a relationship between a plurality of successive ranges of said deceleration rate of said wheel, and a corresponding plurality of different values of said extension time, and selecting one of said different values of said extension time which corresponds to the deceleration rate detected when said predetermined pressure-decrease time has elapsed.

7. A method of controlling an anti-lock braking system according to claim 1, wherein said skidding or locking condition of said wheel is detected as a difference between a running speed of said vehicle and a rotating speed of said wheel, and said decrease in said fluid pressure for said predetermined pressure-decrease time is commenced after said difference exceeds a predetermined value.

8. A method of controlling an anti-lock braking system according to claim 7, wherein said decrease in said fluid pressure for said predetermined pressure-decrease time is commenced if said difference exceeds a predetermined value and if the deceleration rate of said wheel detected before said commencement exceeds a predetermined threshold value.

9. A control system for controlling an anti-lock braking system having a brake for a wheel of a motor vehicle, including detector means for detecting a skidding or locking condition of the wheel based on a running condition of the vehicle and a rotating condition of the wheel, and pressure-regulating means for maintaining a slip ratio of the vehicle within an optimum range by increasing, decreasing and holding a brake fluid pressure applied to said brake, in response to the detected locking condition of the wheel, comprising:

time-measuring means for measuring a predetermined pressure-decrease time during which said fluid pressure is decreased;
    detecting means for detecting a deceleration rate of a rotating speed of said wheel when said pressure-decrease time has elapsed; and
    decrease-time extending means for determining an extension time during which the fluid pressure is further decreased, such that said extension time increases with the detected deceleration rate of said wheel, said decrease-time extending means activating said pressure-regulating means to further decrease said fluid pressure for the determined extension time.

10. A control system for controlling an anti-lock braking system according to claim 9, further comprising means for determining whether the deceleration rate of said wheel is increasing or decreasing when said determined extension time has elapsed, and controlling said pressure-regulating means so as to continue an operation to decrease said fluid pressure even after said extension time has elapsed, if the deceleration rate is increasing when said extension time has elapsed, and so as to hold said fluid pressure after said extension time has elapsed, if the deceleration rate is decreasing when said extension time has elapsed.

* * * * *